Patented Apr. 17, 1951

2,549,127

UNITED STATES PATENT OFFICE 2,549,127

WOOD WATERPROOFING COMPOSITION

Donald D. Pew, Kalamazoo, Mich., assignor to Stopall Waterproofing Manufacturers Inc., Kalamazoo, Mich., a corporation of Michigan No Drawing. Application September 13, 1950, Serial No. 184,701

3 Claims. (Cl. 260—24)

This invention relates to wood waterproofing compositions which may be applied at any normal atmospheric temperatures, and is more particularly concerned with a waterproofing composition containing a hydrogenated methyl abietate, a chlorinate polyphenyl, dipentene, and a substituted polysiloxane resin, in combination with suitable solvents.

Perhaps the most serious objection to prior known waterproofing compositions is that a hard surface does not result from treatment with such compositions. It is virtually impossible to obtain a tack-free painted surface when such is the case. In an attempt to overcome this difficulty, compositions embodying silicone resins have been proposed. However, these silicones alone are impractical both from an economical basis and the fact that the actual water resistance is not as great as might be desired in most instances. Further, most of the above-described materials must be applied at temperatures above about eighty degrees Fahrenheit, else precipitation and uneven coating results.

It is, therefore, a principal object of the present invention to provide a waterproofing composition which dries to a hard, transparent surface easily painted. A further object of the invention is the provision of a waterproofing composition suitable for application to all types of wood. Still another object of the present invention is the provision of a waterproofing composition which may be applied at the complete range of normal atmospheric temperatures. Another object of the present invention is the provision of a waterproofing composition having the ability to preclude the passage of water to a degree far greater than any commercially available product.

The foregoing and additional objects have been accomplished by the provision of a waterproofing composition containing: between about five and ten percent dipentene; a chlorinated polyphenyl between about three and six percent; hydrogenated methyl abietate between about seven and twelve percent; a polysiloxane between about three and six percent, the remainder being solvents, fungicides and driers.

Dipentene, preferably employed in an amount of about 7.9 percent of the total mixture, is a commercially available product obtained as a byproduct from the manufacture of certain terpenes.

While polysiloxanes broadly are suitable for the purposes of this invention, a methyl phenyl polysiloxane has been found to be the most suitable. This component is preferably employed in an amount of about 4.0 percent of the weight of the total mixture. A particularly desirable silicone material is known as 81129, and is sold by General Electric Company.

The chlorinated polyphenyls are a commercial product available under the tradename "Aroclor," and are described, together with the method of manufacture, in Patent 1,892,397, issued to R. L. Jenkins, December 27, 1932, and now produced by Monsanto Chemical Company. As disclosed in that patent and known to the art, the properties of these chlorinated polyphenyls vary with respect to liquidity or solidity, with a degree of chlorination. It varies from a very light mobile liquid through a viscous oil to a solid having a crystalline structure. For the purposes of this invention, chlorinated polyphenyls, known as Aroclor 5460, a yellow transparent brittle resin, having a specific gravity, (25°/25° C.) of 1.712 to 1.723, a distillation range of 230–320 degrees centigrade at four millimeters of mercury, a softening point between 15.5 and 18.3 degrees centigrade, and a refractive index $n_D^{20}$ of 1.664–1.667 is preferred. The chlorinated polyphenyls are preferably employed in an amount of about 4.8 percent of the total weight of the mixture.

A hydrogenated methyl abietate is preferably employed in an amount of about 9.4 percent by weight of the total mixture and is sold commercially under the tradename "Hercolyn," by The Hercules Powder Company, Cleveland, Ohio.

Suitable solvents for the above components include alkylated benzenes in combination with the medium boiling aliphatic solvents. Representative aromatic solvents which are suitable include toluene, xylenes, mesitylene, pseudomesitylene, ethylbenzene, et cetera. Aliphatic hydrocarbon solvents which are suitable include hexanes, heptanes, octanes, nonanes, and decanes, and I preferably employ a mixture of these known as petroleum spirits. The ratio of aromatic to aliphatic solvents, may vary between about 100 percent aromatic to 60 percent aromatic, the remainder being aliphatic. The solvent will generally account for between about 60 and 75 percent of the total mixture but preferably is about 69.2 percent of the mixture.

Depending upon the particular wood to be treated, it may be desirable to include certain polychlorinated benzenes or polychlorinated phenols in the formulation as a fungicide and wood preservative. These materials are usually employed in an amount between about four and about six percent by weight of the mixture, preferably about 5.0 percent.

The addition of zinc octoate represents a preferred embodiment of this invention. When this agent is employed in an amount of about 0.1 percent by weight of the mixture the drying time of the material is decreased by about one-half.

The formulation is conveniently prepared by heating the mixture of solvents to a temperature between about forty and eighty degrees centigrade, and adding all of the materials, except the silicone, and drier, if used. After complete solution has been attained, the temperature is reduced to below 35 degrees centigrade and the silicone and drier added. Agitation is preferably employed to decrease the time required for complete solution.

The following example is given to illustrate the preferred embodiment of the invention and is not to be construed as limiting.

Example

A mixture of 151.4 milliliters of a mixture of alkylated benzenes having a minimum boiling point of 158 degrees centigrade, a maximum of 171 degrees centigrade, and a mean boiling point of 163.5 degrees centigrade (EnnJay 100 Solvent, Standard Oil Company, New Jersey), 229.9 milliliters of mineral spirits consisting of octanes, nonanes, and decanes, having a boiling point of about 168 degrees centigrade, and 58.6 milliliters of xylene was maintained at a temperature of about sixty degrees centigrade. There was added to this mixture maintained at this temperature 49.2 grams of dipentene, 22.7 grams of Aroclor 4465, 49.9 grams of hydrogenated methyl abietate, and 22.7 grams of pentachlorophenol. The mixture was stirred until complete solution was attained, and the temperature thereafter reduced to thirty degrees centigrade. Approximately 21.0 grams of methyl phenyl polysiloxane (Silicone 81129, No. 81091 or No. 81182, General Electric) and 0.4 gram zinc octoate added thereto. When complete solution was attained, it is found that the material was exceptionally suitable as a wood waterproofing composition.

Testing procedure

A number of pieces (¼" x 1½" x 10") ponderosa pine weighed to a constant weight in the humidifier was dipped in the material of Example 1 for thirty seconds at room temperature (70 degrees Fahrenheit, plus or minus five degrees) and stored on an elevated screen in the atmosphere for four days. They were then returned to the humidifier until a constant weight was obtained and adjacent pieces from the same block, which were untreated, were similarly brought to a constant weight. The treated and untreated blocks were immersed in water for a period of one-half hour and the swelling of each dimension measured in a direction parallel to the ten-inch dimension. It was noted that between 1.85 percent and 2.4 percent swelling was obtained in the untreated blocks, while less than 0.37 percent, with an average of approximately 0.06 percent swelling was obtained in the treated material. This method is the tentative standard method of testing water repellents, developed by the National Woodworking Association.

Further tests were run for penetration ability and it was determined that the end of the grain was penetrated between one-fourth and one-half inch by this material, showing that excellent penetration is obtained.

The material was painted over and the paint thereon found to dry approximately six times as fast as similarly painted untreated blocks.

Various modifications may be made in the composition of the present invention without departing from the spirit or scope thereof, and it is to be understood that I limit myself only as defined by the appended claims.

I claim:

1. A waterproofing composition comprising:

|   | Per cent |
|---|---|
| A chlorinated polyphenyl | 4 to 10 |
| Hydrogenated methyl abietate | 7 to 12 |
| A methyl phenyl polysiloxane | 3 to 6 |
| Solvents | 71 to 92 |

2. A waterproofing composition comprising:

|   | Per cent |
|---|---|
| A chlorinated polyphenyl | 4.8 |
| Dipentene | 7.9 |
| Hydrogenated methyl abietate | 9.4 |
| A methyl phenyl polysiloxane | 4.0 |
| Solvents other than dipentene | 73.9 |

3. A waterproofing composition comprising:

|   | Per cent |
|---|---|
| A chlorinated polyphenyl | 4.5 to 5.5 |
| Pentachlorophenol | 4.5 to 5.5 |
| Hydrogenated methyl abietate | 7.0 to 9.5 |
| A methyl phenyl polysiloxane | 3.0 to 6.0 |
| Zinc octoate | .1 |
| Solvents | 83. to 79. |

DONALD D. PEW.

No references cited.